(12) United States Patent
Amado et al.

(10) Patent No.: US 6,881,329 B2
(45) Date of Patent: Apr. 19, 2005

(54) GRAVITY SEPARATOR FOR MULTI-PHASE EFFLUENTS

(75) Inventors: Jul Amado, Paris (FR); Baptiste Germond, Châtenay Malabry (FR); Pierre Le Foll, Antony (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 53 days.

(21) Appl. No.: 10/258,634

(22) PCT Filed: Apr. 26, 2001

(86) PCT No.: PCT/EP01/04719
§ 371 (c)(1),
(2), (4) Date: Feb. 3, 2003

(87) PCT Pub. No.: WO01/83073
PCT Pub. Date: Nov. 8, 2001

(65) Prior Publication Data
US 2003/0159986 A1 Aug. 28, 2003

(30) Foreign Application Priority Data
May 3, 2000 (FR) .............................. 00 05666

(51) Int. Cl.$^7$ .............................. C02F 1/40; B01D 17/02
(52) U.S. Cl. ....................... 210/96.1; 210/521; 210/540
(58) Field of Search ................... 210/242.1, 242.3, 210/521, 522, 538, 539, 540, 532.1, 96.1

(56) References Cited

U.S. PATENT DOCUMENTS

| 289,877 A | * | 12/1883 | Wilson | 210/540 |
|---|---|---|---|---|
| 306,169 A | * | 10/1884 | Moseley | 210/540 |
| 2,826,306 A | * | 3/1958 | Burns | 210/539 |
| 3,971,719 A | * | 7/1976 | Peters | 210/540 |
| 4,551,246 A | * | 11/1985 | Coffing | 210/540 |
| 4,867,872 A | * | 9/1989 | Russell et al. | 210/538 |
| 4,980,070 A | * | 12/1990 | Lieberman | 210/522 |
| 5,059,312 A | * | 10/1991 | Galletti | 210/540 |
| 5,372,711 A | * | 12/1994 | Sill | 210/540 |
| 5,378,376 A | * | 1/1995 | Zenner | 210/540 |
| 5,693,218 A | * | 12/1997 | Yamamoto et al. | 210/540 |
| 5,824,228 A | * | 10/1998 | Bolomier et al. | 210/800 |
| 5,897,773 A | * | 4/1999 | Rhodes | 210/242.1 |

FOREIGN PATENT DOCUMENTS

DE 9101241 * 6/1991

* cited by examiner

Primary Examiner—Christopher Upton
(74) Attorney, Agent, or Firm—Victor H. Segura; Brigitte L. Echols

(57) ABSTRACT

The invention relates to a gravity separator for an effluent made up of a multi-phase fluid mixture comprising at least a heavy first phase and a supernatant second phase. According to the invention, said separator includes adjustment means for adjusting its geometrical separation characteristics.

8 Claims, 3 Drawing Sheets

GRAVITY SEPARATOR FOR MULTI-PHASE EFFLUENTS

The invention relates to a gravity separator for multi-phase effluents. A preferred application of the invention relates to a separator for effluent from an oil well, said effluent typically comprising three phases: an aqueous phase, a liquid hydrocarbon phase, and a gaseous hydrocarbon phase.

After a hydrocarbon well has been drilled and made safe, production is started from the well for a relatively short time in order to identify clearly the types and magnitudes of its various components, and in order to estimate the production capacities of the well. These tests, commonly referred to as "well testing", use means for separating out the various phases of the effluent (water, oil, and gas). Since the various phases are of different densities, separation takes place continuously in a vertical separator, in which the phases settle out. Downstream from the separator, the aqueous phase is discharged, optionally after undergoing additional purification, and the hydrocarbons are burnt off.

At the beginning of the testing step, the composition of the effluent varies enormously. Insofar as the well is initially filled with aqueous residues from the drilling fluid and from the completion fluid, the effluent that is collected is essentially made up of water. Then, gradually, the percentage of aqueous residue decreases, and the composition of the effluent becomes enriched with oil and with gas.

Since state-of-the-art separators are dimensioned to treat effluents whose phase ratio remains substantially stable over time, it is not possible to use them for the effluent at the beginning of the testing step. Therefore, ways are sought to dispose of the effluent directly.

For that purpose, a first solution is known that consists in sending the effluent directly to burners without any separation step being performed. Unfortunately, the burners known from the state of the art are effective only for mixtures in which the hydrocarbon content is at least 70% to 80%. As a result, when the effluent is sent directly to such burners, the environment is polluted to a relatively large extent because of unburnt hydrocarbons. That solution poses serious pollution problems and is thus unacceptable.

Another known solution consists in recovering the effluent and in storing it temporarily in containers, until the oil that it contains separates from the aqueous phase and floats on the surface of it in said containers. The oil phase is then recovered, and it is sent to the burners while the resulting cleaned aqueous phase is disposed of. Although that method gives rise to lower risks for the environment, it requires the site to be equipped with separators and additional pipes, constituting costly and voluminous equipment.

Another method consists in building an independent installation for treating effluent when its multi-phase ratio is not stable. Although that method is ecologically very satisfactory, it increases problems related to the cost of treatment installations and to the space they take up. Logistics problems are then particularly numerous.

An object of the invention is to solve the problem of pollution related to treating an effluent whose multi-phase ratio varies over time, without it being necessary to collect waste which must then be treated subsequently.

To this end, the invention provides a gravity separator for an effluent made up of a multi-phase fluid mixture comprising at least a heavy first phase and a supernatant second phase, said separator including adjustment means for adjusting its geometrical separation characteristics.

By adjusting its geometrical separation characteristics, it is possible to treat effluent whose phase ratio is not-constant over time. As a result, when used for effluent from an oil well, the separator of the invention makes it possible to treat said effluent throughout the period during which the ratios of the three phases, namely water, oil, and gas, are not stabilized.

It is thus possible to treat the effluent in the separator regardless of how the volume ratios of the various phases fluctuate as a function of time. Insofar as the separator of the invention is followed by a burner, the burner receives a mixture whose hydrocarbon content makes it possible to burn off the hydrocarbons without any discharge that is harmful to the environment, and a cleaned aqueous phase is recovered without an additional separator being necessary.

The separator of the invention thus makes it possible to preserve the environment without it being necessary to collect waste that must then be treated by an auxiliary installation.

In an advantageous embodiment of the invention, the adjustment means for adjusting its geometrical separation characteristics make it possible to give preference to separating out certain phases of the effluent, taken on their own or in combination.

This makes it possible to act on the separation characteristics in order to give preference to the retention time of one phase in particular, depending on whether a higher level of purity is desired on one or other of the phases. This is particularly advantageous if very clean water is to be obtained, so that, for example, it is possible to discharge said water directly without polluting the environment.

The invention will be well understood on reading the following description given with reference to the accompanying drawings. The list of accompanying drawings is as follows.

The separator of the invention makes it possible to treat effluent whose characteristics are as follows:

At the beginning of the transitional stage, the effluent contains a very small proportion of gaseous hydrocarbons. The majority of the separator must therefore be dedicated to separating the liquid-liquid phase, while the space left for the gas phase can be minimized. In addition, most of the liquid-liquid phase is itself made up essentially of water, very little oil being supernatant on said phase.

At the end of the transitional stage and during the separation stage, the effluent is made up mostly of oil and of gas. In contrast, the percentage of water in the effluent is reduced considerably. It is thus necessary to maximize the space available in the separator for the oil phase and then for the gas phase.

Figure 1:
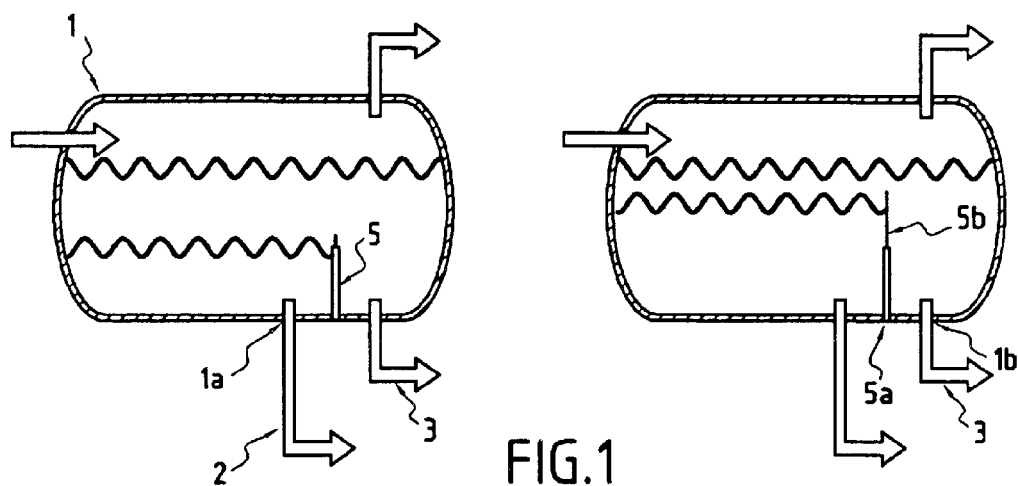
FIG. 1 is a view of an embodiment of a separator of the invention.

FIG. 1 shows an embodiment of a separator 1 of the invention, in which the phases settle out by gravity. By way of example, this separator 1 is substantially cylindrical in shape, and is the size of a tank that can be transported by truck. When treating effluent from an oil well, it must be possible to move the separator from site to site, and it thus necessary to have a separator of limited size.

As is known and not shown, a solids separator followed by a heat exchanger, and a burner are disposed respectively upstream and downstream from said separator 1.

In the embodiment shown in FIG. 1, the separator 1 is provided with a separation or "weir" plate 5 whose height is adjustable as a function of the composition of the effluent. The weir plate 5 defines a first compartment for a heavy first phase, namely water, and a second compartment fed by overflow with the lower-density oil phase that floats on the aqueous phase. The weir plate 5 is made up of a support 5*a* and of various telescopic leaves 5*b* which can be deployed vertically towards the top of the separator 1.

Figure 2:
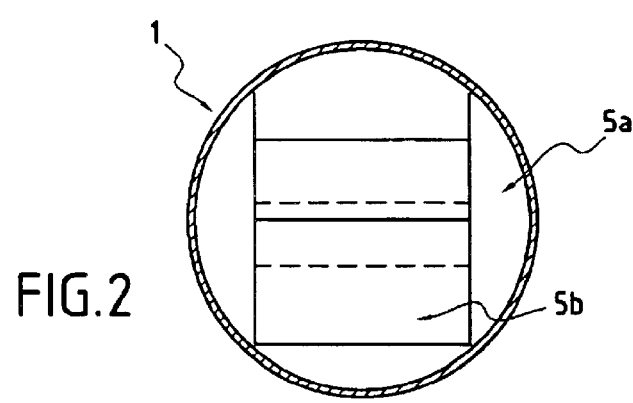
FIG. 2 is a cross-section view of said separator.

As shown in FIG. 2, the outlines of the support 5*a* follow the inside walls of the substantially-cylindrical separator 1. The moving leaves 5*b* are of substantially rectangular shape, and they are carried by the support 5*a*. The shape of the support 5*a* and the dimensions of the rectangular leaves 5*b* are complementary so as to occupy the entire width of the separator 1. In this way, the weir plate assembly 5 constitutes a genuinely fluid-tight obstacle over a certain height, inside the separator 1.

The leaves 5*b* can thus be deployed gradually so as to form a weir plate of variable height. As a result, the further the telescopic weir plate 5 is deployed, the higher the maximum possible level of water and the longer the retention time for which the effluent is retained in the separator.

The leaves 5*a* of the telescopic weir plate 5 are in contact with one another. Whenever it is necessary to increase the height of the weir plate 5 slightly, the first leaf is deployed and is placed in vertical alignment with the other leaves. As a function of the desired height of the weir plate, the leaves 5*b* are successively deployed and each new leaf vertically increments the leaf most recently put in place.

In the low position, all of the leaves 5*b* are retracted inside the support 5*a* from which they do not project. In the embodiment shown, taking account of the overall size of the support and of the leaves, the nominal height of the weir plate, with all leaves retracted, represents substantially 30% of the height of the separator.

In the same embodiment, and in the high position, once all of the leaves 5*b* have been deployed, the height of the weir plate 5 represents substantially 65% of the total height of the separator 1. Provision is made for said leaves 5*b* to overlap so as to guarantee that suitable sealing is provided between all of the leaves without hindering the displacement of said leaves relative to one another.

The separator 1 is provided with three outlet ducts. The water phase and the oil phase are recovered respectively via the ducts 2 and 3 placed at the bottom of the separator. The gaseous phase is recovered via a duct 4 which, by way of example, conveys the gases to a burner (not shown). By way of example, the burner is a flare.

The first removal duct 2 for removing the aqueous phase is connected to an aqueous phase recovery duct l*a* which is situated in the bottom portion of the separator 1, upstream from the weir plate 5. A turbidimeter (not shown) makes it possible to determine the percentage of oil in the discharged water at the outlet of the separator 1. In one embodiment, the water is then sent via the duct 2 to an additional re-treatment unit that is not shown and that is known from the state of the art.

The second removal duct 3 for removing the oil phase is connected to an oil recovery duct 1*b* which is also situated at the bottom portion of the separator 1. A sensor on the removal duct 3 makes it possible to determine the percentage of water in the oil leaving the separator 1.

It is possible to regulate the flow rate of the water sent to the removal duct 2 so that the level of the liquid phases does not exceed the height of the telescopic weir plate 5. Similarly, the flow rate of oil sent to the burner is regulated so that, inside the separator, said oil can always flow away by flowing over the telescopic weir plate 5.

Typically, at the start of the transitional stage, since the percentage of water in the effluent is particularly high, the weir plate 5 is at its maximum height. This, together with the regulation of the flow rate of water leaving the separator guarantees maximum water retention time and therefore particularly effective separation of the water and oil phases.

Thereafter, the percentage of water in the effluent decreases, while the percentage of oil therein increases. Thus, the capacity of the compartment dedicated to water, i.e. the height of the telescopic weir plate 5, is gradually reduced.

The separator 1 of the invention thus makes it possible to respond to changes in the composition of the effluent, such as those indicated above. The separation characteristics of the separator can be adjusted as a function of the composition of the effluent. Thus, regardless of how the volume ratios of the various phases of the effluent vary as a function of time, the separator adapts itself continuously to match said ratios so as to separate said phases.

With the separator of the invention, it is possible to treat a petroleum effluent during the transitional stage when the ratios of the oil, water, and gas phases have not yet become stable. As a result, the separator of the invention makes it possible to treat effluent continuously, as soon as it leaves the well, without giving rise to environmental pollution or to waste that needs to be treated separately.

Figure 3:
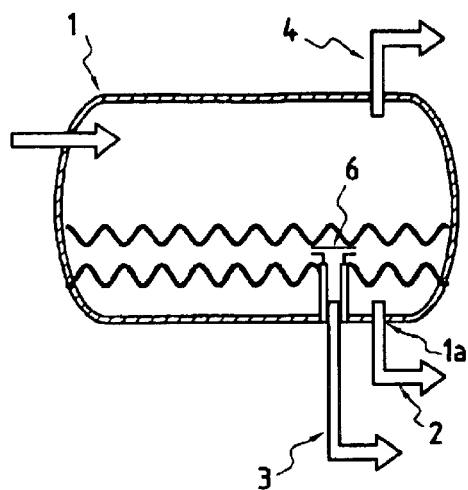
FIG. 3 is a view of another embodiment of a separator of the invention.
Figure 3:
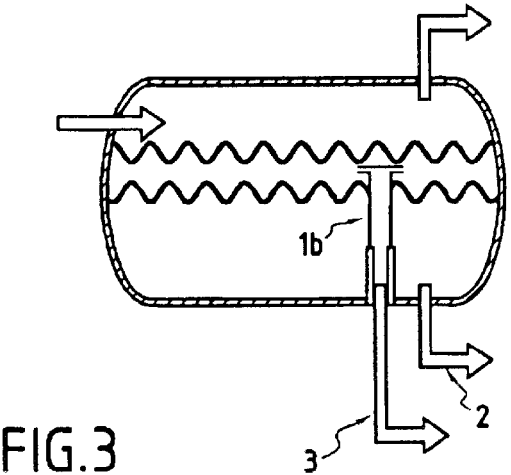

FIG. 3 shows another embodiment of a separator of the invention. In this embodiment, the separator 1 does not include a telescopic weir plate 5, since the separation is not performed by causing the oil phase to flow over said weir plate 5. Both the water phase and the oil phase can thus extend over the entire length of the separator 1. This solution makes it possible to increase the water retention capacity of the separator 1.

The recovery duct 1*a* for recovering the aqueous phase is situated at the bottom portion of the separator 1, substantially at its end remote from the inlet duct via which the effluent is fed into said separator. In this way, said recovery duct 1*a* is situated in a zone in which the two liquid phases of the effluent are well separated. The removal duct 2 for removing the aqueous phase is connected to said recovery duct 1*a*. In order to avoid any turbulence, which would hinder separation of the liquid phases a baffle, 1*c* can be placed immediately above the water recovery duct 1*a*, for example.

The removal duct 3 for removing the hydrocarbon phase is also situated at the bottom portion of the separator 1.

A recovery duct 1*b* is connected to said removal duct 3. The recovery duct 1*b* is made up of a telescopic tube comprising coaxial cylinders that are capable of moving progressively relative to one another in a vertical direction inside the separator 1.

Figure 5A:
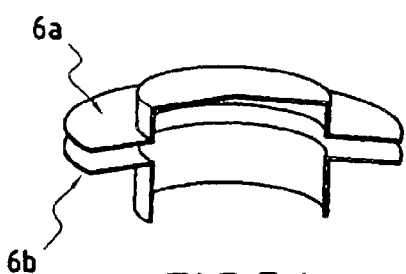
FIG. 5a is a section view of a detail of an embodiment of a separator of the invention.
Figure 5B:
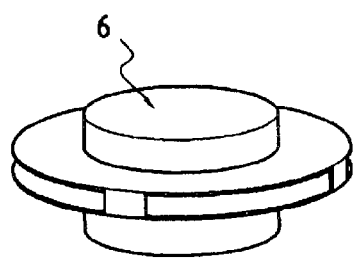
FIG. 5b is a perspective view of the same detail.
Figure 6:
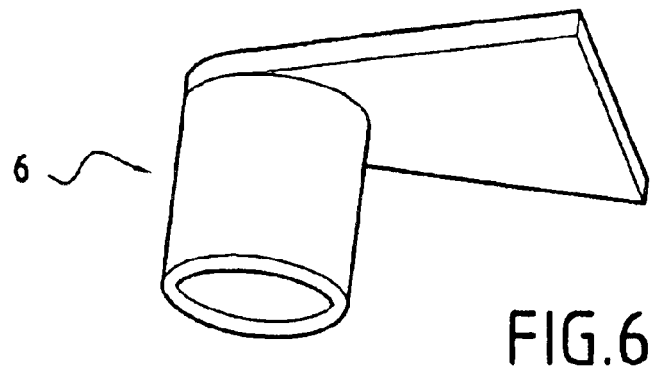
FIG. 6 is a view of a detail of another embodiment of a separator of the invention.

The recovery duct 1*b* is terminated by a suction intake or "collector" 6, embodiments of which are shown in more detail in FIGS. 5*a*, 5*b*, and 6. The recovery duct 1*b* is then deployed to an extent that can be caused to vary in order to position the collector 6 in the middle of the oil phase regardless of the multi-phase ratio of the effluent. During the transitional stage, the duct 1*b* is thus extended to its maximum extent so as to place the collector 6 high in the separator, in the oil phase, and so as to maximize the volume of the separator that is available for the aqueous phase. Then, as a function of the variation in the composition of the effluent, the recovery duct 1b is gradually lowered.

The position of the collector 6 is adjusted so that the percentage of water in the oil phase at the outlet of the separator does not exceed 30%. This is to guarantee that the burners at the outlet of the separator operate effectively, and thus to prevent any discharge of unburnt hydrocarbons into the environment.

Figure 4:
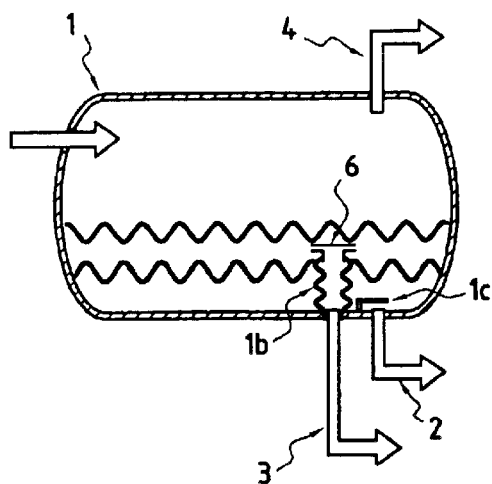
FIG. 4 is a view of another embodiment of a separator of the invention.
Figure 4:
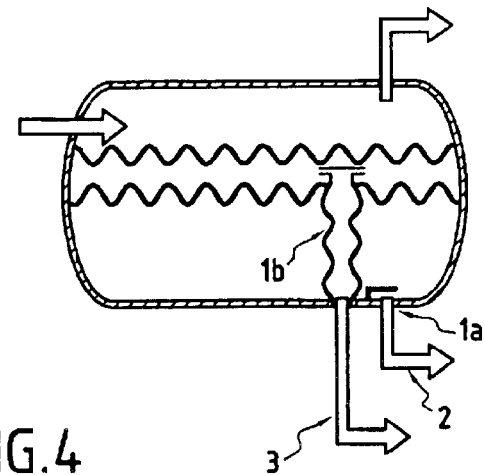

FIG. 4 shows a preferred embodiment of a separator of the invention.

In this embodiment, the recovery duct 1b for recovering the oil is constituted by a bellows of substantially cylindrical shape and made of flexible materials such as plastics materials. In the embodiment shown and for reasons of compactness, related to the materials of the bellows 1b, the nominal height of the bellows corresponds substantially to 30% of the height of the separator 1, whereas, once it is totally expanded, the bellows 1b has a height representing substantially 65% of the height of said separator 1.

A suction intake or "collector" 6 as shown in any one of FIGS. 5a, 5b, and 6 is situated at the end portion of the bellows 1b.

The use of a flexible bellows offers numerous advantages: it is a light-weight and low-cost system that, in addition, does not suffer from the sealing and sliding problems encountered with a telescopic deployment system. Advantageously, a guide device is provided that is constituted, for example, by four guide stakes.

As described above for the telescopic recovery duct, the bellows 1b is allowed to expand to various extents as a function of the multi-phase ratio of the effluent, so that the collector 6 is always positioned in the middle of the oil phase. During the transitional stage, the bellows 1b is thus at its maximum height, leaving the maximum possible volume available for the aqueous phase. Then, while the effluent is varying, the height of said bellows 1b is adjusted so as to recover oil whose water content is compatible with good burner efficiency at the burners at the outlet of the separator, i.e. a water content that does not exceed 30% in the oil phase.

FIGS. 5a and 5b show a first embodiment of a collector 6 in separators of the invention. This collector is made up mainly of a cover 6a overlying a collar 6b. In this way, the oil is sucked in radially through the empty space between the cover 6a and the collar 6b. This particular geometrical shape makes it possible to reduce turbulence on taking oil into the recovery duct 1b, thereby avoiding the risks of water or gas being sucked in, and the risks of a vortex being generated.

The space between the two portions 6a and 6b is small enough to make it easy to position the collector 6 at the "cleanest" level in the oil phase, so as to recover the oil without running the above-mentioned risks.

FIG. 6 shows another embodiment of a collector 6. This collector is substantially in the form of a cylinder supporting a duck bill opening. Suction takes place radially, and the collector 6 can be positioned angularly so as to situate it as well as possible in the supernatant oil phase.

The position of the collector 6 in the oil phase can be adjusted at any time during the separation process. For example, the collector 6 is firstly positioned in the middle of the oil phase. Then, secondly, the position is re-adjusted. For this purpose, in order to take account of the thickness of the collector 6, the decision is taken to place said collector in the oil phase in a zone ranging from 5% above the interface between the two liquids to 5% below the level of the liquid. This makes it possible to maintain a water percentage of less than 30% in the oil at the outlet of the separator, which percentage is compatible with state-of-the-art burners. The position of the collector is re-adjusted as a function of variation in measurements made at the outlet of the separator.

Figure 7:
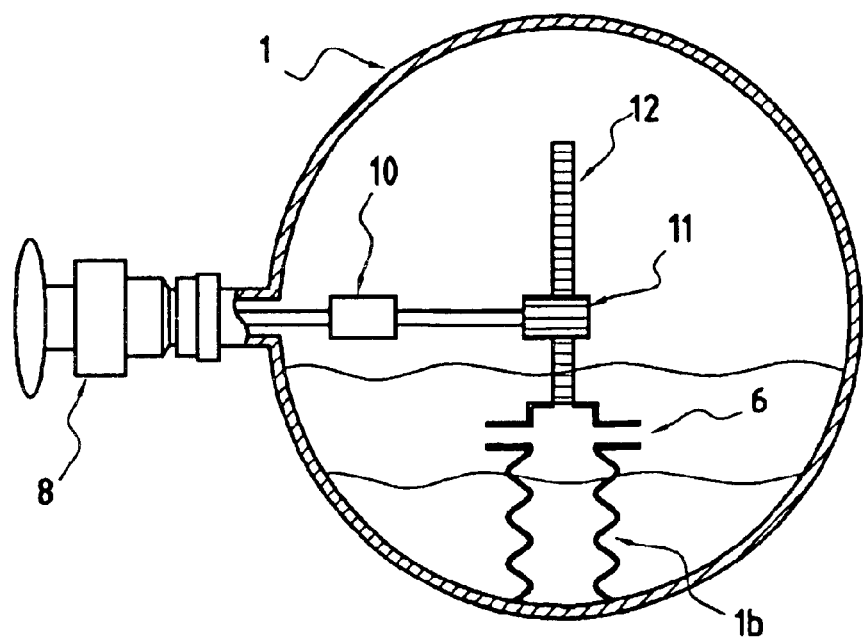
FIG. 7 is an example of a drive device associated with an embodiment of a separator of the invention.

FIG. 7 shows an actuator device for actuating the various above-described systems. This device makes it possible to drive the recovery duct 1b, be it in the form of a bellows, in the form of a telescopic tube, or in the form of a telescopic weir plate 5.

As shown in FIG. 7, the actuator device is made up of pneumatic, hydraulic, or electrical actuator means 8 connected via a stepdown gearbox 10 to a worm screw 11 situated inside the separator 1. The worm screw 11 serves to drive a threaded rod 12 which (as shown in FIG. 7) is itself connected to the collector 6 or to the first weir leaf 5b.

In another embodiment, the drive means of the actuator device are situated outside the separator and are connected to a drive device constituted by a lever arm connected to the recovery duct 1b (i.e. the bellows or the cylinders of the telescopic tube) or to the weir leaves 5b. The drive device then has means for gearing down the movement in translation.

The separator of the invention thus makes it possible to adapt the geometrical characteristics of the separation to match any effluent composition. In addition, as well as making geometrical adjustments to the separation means, it is possible to vary the flow rates of the various phases at the respective outlets of the separator, and thus to give preference to water retention time or to oil retention time, or to the retention times of both of the liquid phases. In this way, at the outlets of the separator, it is possible to recover either very pure water, or else oil that is free of any water.

Whatever the multi-phase ratio of the effluent, by continuously adjusting the geometrical characteristics of the telescopic plate 5 or of the recovery ducts 1b, it is possible to achieve effective separation of said phases, and thus to optimize use of the burners at the outlet of the separator. The environment is thus protected from any harmful discharge, while also avoiding having to treat additional waste in auxiliary and costly installations.

In addition, by not fundamentally changing the component parts of a separator known from the state of the art, the separator of the invention is particularly low-cost and easy to make.

The separator can also be used after the transitional stage, once the composition of the effluent has become stable, because it is then necessary merely to lock the level of the weir plate or of the recovery duct. As a result, the separator of the invention can also be used for effluents whose multi-phase ratio is constant. The separator of the invention can thus be used under a particularly wide range of conditions.

What is claimed is:

1. A gravity separator for an effluent made up of a multi-phase fluid mixture comprising at least a heavy first phase and a supernatant second phase, said separator including:

adjustment means (5, 1b) comprising a separation plate or "weir plate" (5) that serves to define a first compartment for the first phase of the effluent and a second compartment fed by the second phase flowing over said weir plate each compartment having an outlet;

actuator means (8); and sensors located at the outlet of the separator (1), said sensors measuring the heavy supernatant phase ratio in the liquid leaving the separator; wherein the actuators means drive the separator plate (5) of the adjustment means in response to the measurements of the sensor.

2. A separator according to claim 1, wherein the weir plate (5) comprises a support (5*a*) and telescopic leaves (5*b*), said leaves (5*b*) being deployable vertically towards the top of the separator (1).

3. A separator according to claim 2, wherein the support (5*a*) and the leaves (5*b*) occupy the entire width of the separator (1), so as to form a fluid-tight obstacle over an adjustable height, inside said separator (1).

4. A gravity separator for an effluent made up of a multi-phase fluid mixture comprising at least a heavy first phase and a supernatant second phase, said separator including:

adjustment means comprising recovery means (1*b*, 6) for recovering the supernatant phase in said separator and directing the supernatant to an outlet, said recovery means (1*b*, 6) passing through the heavy phase;

actuator means (8); and a sensor located at the outlet of the separator (1), said sensor measuring the heavy to supernatant phase ratio in the supernatant leaving the separator, wherein the actuator means adjusts the level of the recovery means (1*b*, 6) of the adjustment means in response to the measurements of the sensor.

5. A separator according to claim 4, wherein the recovery means (1*b*, 6) for recovering the supernatant phase are constituted by a telescopic tube (1*b*) made up of coaxial cylinders that are driven by the actuator means (8) progressively relative to one another in a vertical direction as a function of the multi-phase ratio of the effluent.

6. A separator according to claim 4, wherein the recovery means (1*b*, 6) for recovering the supernatant phase are constituted by a flexible bellows (1*b*) that is driven by the actuator means (8) as a function of the multi-phase ratio of the effluent.

7. A separator according to claim 6, wherein guide means support the bellows so as to guide it vertically inside said separator (1).

8. A separator according to claim 4 wherein the recovery means (1*b*, 6) for recovering the supernatant phase are provided with a suction intake or "collector" (6) that is radial and/or directional regarding the supernatant phase surface.

* * * * *